United States Patent
Eschenbach

(12) 
(10) Patent No.: US 6,529,830 B1
(45) Date of Patent: *Mar. 4, 2003

(54) METHOD AND SYSTEM FOR PROVIDING WIDE AREA AUGMENTATION SYSTEMS (WAAS) LIKE CORRECTIONS USING A SERVER AND PROCESSOR ON THE INTERNET

(75) Inventor: Ralph Eschenbach, Woodside, CA (US)

(73) Assignee: Trimble Navigation Ltd., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/844,866

(22) Filed: Apr. 26, 2001

Related U.S. Application Data

(63) Continuation-in-part of application No. 08/906,176, filed on Aug. 4, 1997, now Pat. No. 6,324,473.

(51) Int. Cl.[7] ............................................. G06F 165/00
(52) U.S. Cl. .................. 701/215; 701/213; 342/357.06; 342/358
(58) Field of Search ................................. 701/213, 214, 701/215, 216; 342/357.01, 357.02, 357.06, 357.09, 358; 455/12.1

(56) References Cited

U.S. PATENT DOCUMENTS

| | | | |
|---|---|---|---|
| RE34,004 E | 7/1992 | Rogoff et al. | |
| 5,309,439 A | 5/1994 | Roos | |
| 5,323,322 A | * 6/1994 | Mueller et al. | ............ 701/215 |
| 5,477,458 A | 12/1995 | Loomis | |
| 5,563,607 A | 10/1996 | Loomis et al. | |
| 5,899,945 A | 5/1999 | Baylocq et al. | |
| 5,899,957 A | 5/1999 | Loomis | |
| 5,910,789 A | 6/1999 | Vigen | |
| 5,926,113 A | 7/1999 | Jones et al. | |
| 5,928,306 A | 7/1999 | France et al. | |
| 5,959,577 A | 9/1999 | Fan et al. | |
| 6,018,818 A | 1/2000 | Sheynblat | |
| 6,073,024 A | 6/2000 | Hasegawa | |
| 6,324,473 B1 | * 11/2001 | Eschenbach | ............... 701/215 |

FOREIGN PATENT DOCUMENTS

WO  WO95/18977  7/1995

OTHER PUBLICATIONS

"GPS Interface Control Document ICD–GPS–200, NAVSTAR GPS Space Segment and Navigation User Interfaces", IRN–200B–PR–001, Jul. 1, 1992, Reprinted Feb. 1995.

* cited by examiner

*Primary Examiner*—Gertrude Arthur
(74) *Attorney, Agent, or Firm*—Blakely Sokoloff Taylor & Zafman LLP

(57) ABSTRACT

A method and system that provide WAAS like corrections using a server and processor on a network. For one method, satellite measurement data is collected. Satellite position error corrections are computed using the collected satellite measurement data. The computed satellite position error corrections are stored. The stored satellite position error corrections can then be later retrieved and used by a server and processor coupled to the Internet.

21 Claims, 11 Drawing Sheets

METHOD AND SYSTEM FOR PROVIDING WIDE AREA AUGMENTATION SYSTEMS (WAAS) LIKE CORRECTIONS USING A SERVER AND PROCESSOR ON THE INTERNET

RELATED APPLICATION

This application is a Continuation-in-Part and claims priority to U.S. patent application Ser. No. 08/906,176 entitled "METHOD AND APPARATUS FOR COLLECTING, PROCESSING, AND DISTRIBUTING DIFFERENTIAL GLOBAL POSITIONING SYSTEM INFORMATION USING THE INTERNET," filed on Aug. 4, 1997, now U.S. Pat. No. 6,324,473, issued Nov. 27, 2001, which is hereby incorporated herein by reference.

FIELD OF THE INVENTION

The present invention relates to the field of Global Positioning Systems (GPS). More particularly, the present invention relates to a method and system for providing Wide Area Augmentation System (WAAS) like corrections using a server and processor on the Internet.

BACKGROUND OF THE INVENTION

A Satellite Positioning System uses a series of Satellites, which broadcast, coded radio signals that enable a properly equipped user to determine a three-dimensional position and time anywhere on or near the surface of the Earth. The NAVSTAR Global Positioning Systems (GPS) system, operated by the U.S. Department of Defense, is the first Satellite Positioning system widely available to civilian users.

GPS receivers often yield inaccurate positioning results due to errors that corrupt the system. Most of the errors are "common errors." Common errors are errors that are experienced by all the GPS receivers in a local area. Common errors include satellite clock deviation, satellite orbit drift, the effects on the satellite clock caused by the Department of Defense's Selective Availability (SA), and changing radio propagation conditions in the Ionosphere and Troposphere.

To improve the accuracy of GPS receivers, differential GPS (DGPS) was created. Differential GPS (DGPS) operates by identifying common errors and then eliminating the influence of the identified common errors to improve the accuracy of the positioning. To implement differential GPS, a first DGPS receiver must be placed at location for which the position coordinates are accurately known and accepted. The DGPS receiver at an accurately known location is called a DGPS "reference station." The DGPS reference station calculates the difference between the known coordinates and the DGPS reference station calculated coordinates to determine the common error introduced to all GPS receivers in a local area. A second DGPS receiver is then placed in a position that needs to be identified. Using the error correction data from the first DGPS receiver (the reference station), the position of the second DGPS receiver can accurately be determined.

The error correction data determined by the reference station is normally broadcast on a particular radio frequency located in a variety of available bands. A standard for broadcasting such DGPS error corrections is known as Radio Technical Committee Maritime (RTCM) SC-104 format. Mobile GPS receivers near the DGPS reference station can receive the broadcast RTCM SC-104 error correction data and apply the error corrections to improve the accuracy of the mobile GPS receivers.

Differential GPS has greatly improved the accuracy of the satellite based GPS system, but there are significant costs associated with this improved service. For example, differential GPS requires more equipment than just a single GPS receiver. Specifically, differential GPS requires a differential GPS reference station and a mobile DGPS receiver. Such differential GPS reference stations are often very expensive. Furthermore, to effectively use a differential GPS reference station an accurate survey must be performed to position the differential GPS reference station at an accurately known location. A radio transmitter must be coupled to the reference station in order to broadcast the error correction information. Consequently, the mobile DGPS receiver must be within a limited area around the reference station to receive the correction information that is broadcasted.

Another type of DGPS system is a Wide Area Augmentation System (WAAS). Unlike DGPS, WAAS provides DGPS accuracy over very large areas, e.g., the continental United States. For WAAS, multiple reference stations are used to collect satellite measurement information that is transmitted to a computing system. The computing system computes satellite position errors and transmits the satellite position errors to a WAAS satellite. The WAAS satellite can then broadcast WAAS corrections using the satellite position errors to a user. A disadvantage of using WAAS is that it requires expensive resources such as a WAAS satellite. Furthermore, the user is limited to a short latency in applying the WAAS corrections, which is typically a few seconds after the satellite measurement information is collected.

It would therefore be desirable to have a system of obtaining differential GPS correction information or WAAS based corrections without all the expense and work of purchasing, installing, and maintaining a differential GPS reference station and WAAS equipment.

SUMMARY OF THE INVENTION

A method and system for providing WAAS like corrections using a server and processor on the Internet are disclosed. In one embodiment, satellite measurement data is collected. Satellite position error corrections are computed using the collected satellite measurement data. The computed satellite position error corrections are stored. The stored satellite position error corrections can then be later retrieved and used by a server and processor on the Internet.

Other features and advantages of the present invention will be apparent from the accompanying drawings, and from detailed description, which follows below.

BRIEF DESCRIPTION OF THE DRAWINGS

The present invention is illustrated by way of example, and not limitation, in the figures of the accompanying drawings in which like references numerals refer to similar elements and in which.

DETAILED DESCRIPTION

A method and system for providing WAAS like corrections using a server and processor on the Internet are described. In one embodiment, satellite measurement data is collected. Satellite position error corrections are computed using the collected satellite measurement data. The computed satellite position error corrections are stored. The stored satellite position error correction can then be later retrieved and used by a server and processor on the Internet.

In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the global Internet. However, the same techniques can easily be applied to other types of computer networks. Furthermore, the present invention is disclosed with reference to the Hyper-Text Transfer Protocol (HTTP), however other computer communication protocols can easily be used to implement the teachings of the present invention.

Differential GPS

Figure 1:
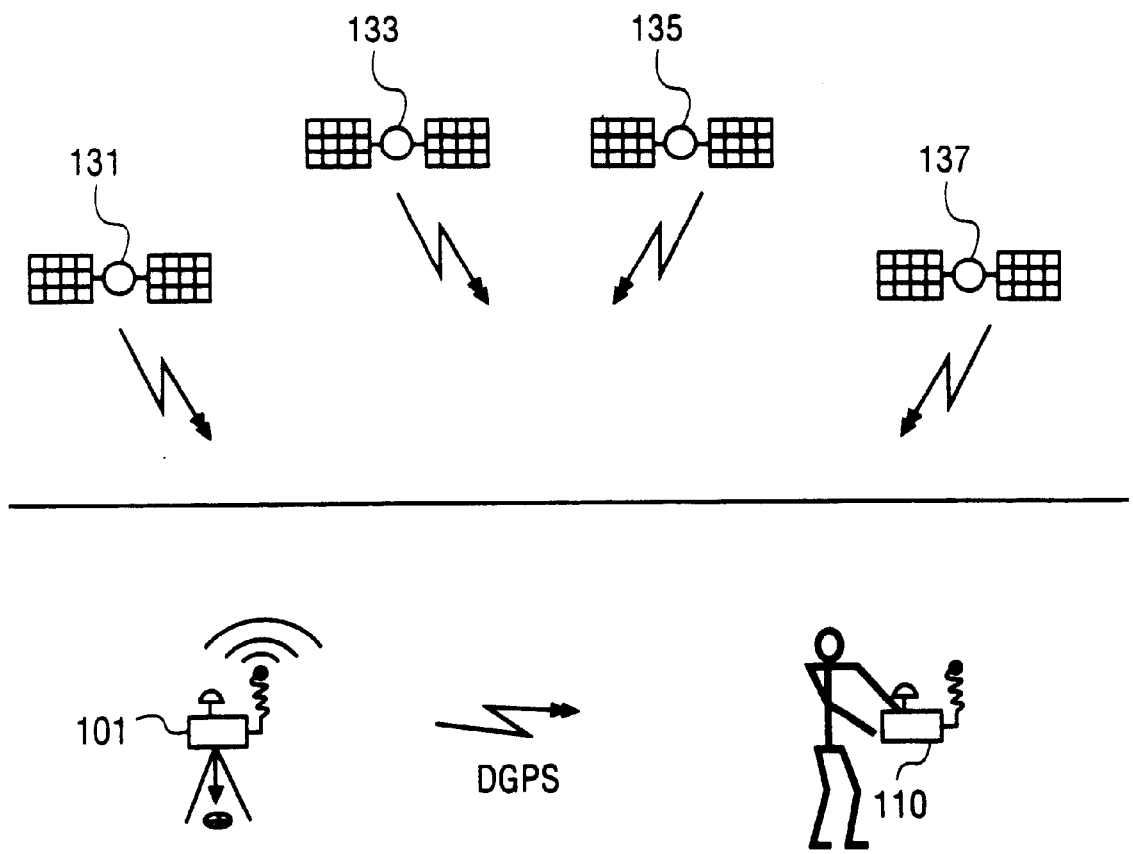
FIG. 1 illustrates a rover GPS unit being used to collect position data and a DGPS reference station being used to calculate and transmit differential GPS error correction information.

FIG. 1 illustrates an example of a differential Global Positioning System (DGPS) in use. In the differential Global Positioning System of FIG. 1, there is a handheld rover GPS unit 110 that is carried by a person for position data collection. The handheld rover GPS unit 110 receives information from a plurality of GPS satellites such as GPS satellites 131, 133, 135, and 137. The handheld rover GPS unit 110 determines an approximate position from the information received from the GPS satellites 131, 133, 135, and 137.

Also illustrated in FIG. 1 is a DGPS reference station 101. The GPS reference station 101 also receives the radio information broadcast from the GPS satellites 131, 133, 135, and 137. However, the position of the DGPS reference station 101 is already accurately known. Using the known position of DGPS reference station 101, DGPS reference station 101 calculates a common error in the GPS information transmitted from satellites 131, 133, 135, and 137. This common error information is then broadcast on a radio frequency to all the roving GPS receiver units in the local area. The International Association of Lighthouse Authorities (IALA) has created a standard radio format entitled Radio Technical Committee Maritime (RTCM) SC-104 for broadcasting DGPS correction information over existing marine radio beacons.

To improve the accuracy of the position determined by the handheld rover GPS receiver unit 110, the handheld rover GPS receiver unit 110 can receive the RTCM SC-104 radio broadcast DGPS error correction information from the reference station. The rover GPS receiver unit 110 applies the error correction information to the position information that the handheld rover GPS unit 110 collected. Using the DGPS error correction information, the handheld rover GPS unit 110 can determine an absolute position within a few meters.

The information within RTCM SC-104 differential GPS error correction messages only pertain common errors that are local to the DGPS reference station that is transmitting the message For this reason, the error correction information generated by a differential GPS reference station is only valid within a 100 kilometer region around the DGPS reference station 101.

Generating DGPS Correction Data

Figure 2:
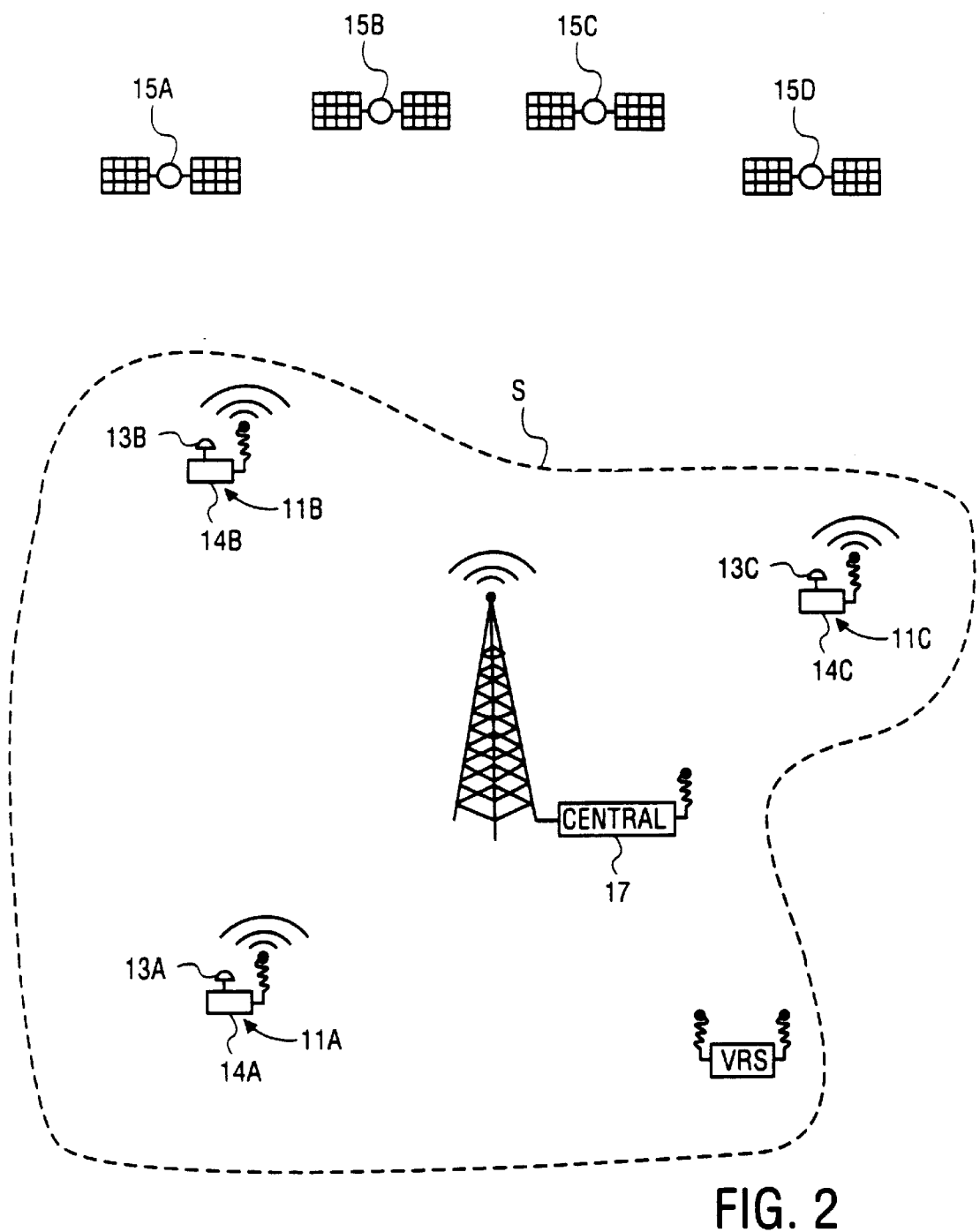
FIG. 2 illustrates an area S that contains three DGPS reference stations at known locations.

FIG. 2 illustrates a large region S with three or more DGPS reference stations 11A, 11B, 11C. Each DGPS reference station includes GPS signal antennas 13A, 13B, 13C, and receiver/processors 14A, 14B, 14C. Each DGPS reference station receives GPS signals, including pseudrange information, from several common-view GPS satellites 15A, 15B, 15C, 15D. A "common-view" satellite is visible from the sites of at least three DGPS reference stations at the same observation times.

The position coordinates of each DGPS reference station is known with high accuracy, either by use of a survey or by some other means. As each DGPS reference station receives the GPS signals from each of the GPS satellites, the GPS-measured pseudorange between the GPS antenna for that DGPS reference station and that satellite is compared with a calculated pseudorange for that DGPS reference station and that satellite. By comparing the measured pseudorange with the calculated pseudorange GPS pseudorange corrections $PRC(t;t0;m;n)$ are generated corresponding to each observable GPS satellite (m=1, 2, 3, 4, ... ) at each DGPS reference station (n=1, 2, 3, ... ).

A pseudorange is derived from a time-of-flight or time of transmission measurement that must be applied to a GPS signal receiver's clock to synchronize a locally generated P-code or C/A-code to achieve maximum cross-correlation with a corresponding code received from a GPS satellite being tracked. The calculation pseudorange $PR(t;t0;m;n)$ and RTCM-formatted pseudorange correction $PRC(t;t0;m;n)$, valid for times t>t0, for a given GPS satellite (m) and a given GPS signal receiver/processor (location n) are described by the relations $$PR(t;t0;m;n)=R_{us}(t;t0;m;n)+\phi_u(t;t0;n)-\phi_s(t;t0;m)+\delta I(t;t0;m;n)++\delta T(t;t0;m;n)+\delta\epsilon(t;t0;m;n), \quad (1)$$

$$PRC(t;t0;m,n)=R_{us}*(t;t0;m;n)-\phi_s*(t;t0;m)-PR_{meas}(t;t0;m;n), \quad (2)$$

$$R_{us}*(t;t0;m;n)=R_{us}(t;t0;m;n)+\epsilon R_{us}(t;t0;m;n), \quad (3)$$

$$\phi_s*(t;t0;m)=\phi_s(t;t0;m)+\epsilon\phi_s(t;t0;m), \quad (4)$$

$$PR_{meas}(t;t0;m;n)=PR(t;t0;m;n)+\epsilon PR_{meas}(t;t0;m;n), \quad (5)$$

Wherein:

$R_{us}$ and $\epsilon R_{us}$ are the true range and error in calculated range, respectively;

$\phi_u$ is the offset of the GPS receiver clock with respect to GPS time;

$\phi_s$ and $\epsilon\phi_s$ are the true clock offset and error in calculated clock offset, respectively;

$\delta I(t;t0;m;n)$ is the signal propagation time delay with respect to free space propagation contributed by the ionosphere;

$\delta T(t;t0;m;n)$ is the signal propagation time delay with respect to free space propagation contributed by the Troposphere;

$\delta\epsilon$ represents residual errors in the pseudorange including multipath errors;

$R_{us}^*$ is the calculated range from the reference station (n) to the satellite (m);

$\phi_s^*$ is the calculated offset of the satellite clock with respect to GPS time (multiplied by the velocity of light in vacuum, c); and $PR_{meas}$ and $\epsilon PR_{meas}$ are the measured pseudorange and error in measured pseudorange, respectively.

Each of the quantities in equations (1) through (5) will vary with time t and will depend upon the GPS receiver/processor chosen (n; often referred to as simply a GPS "receiver" for convenience) and/or the particular GPS satellite (m).

The carrier phase is the time integral of a frequency offset $\delta\omega$ (multiplied by the GPS carrier signal wavelength $\lambda$) that is applied to the GPS receiver's replica GPS signal to maintain phase lock with the carrier of the signal received from a GPS satellite that is being tracked. The propagation velocity c of electromagnetic waves in a vacuum can be used to convert between times and equivalent distances in equations (1) through (5).

Equations (2) through (5) can be combined to yield the relation $$PRC(t;t0;m;n)=R_{us}^*(t;t0;m;n)-\phi$$
$$s^*(t;t0;m)-PR_{meas}(t;t0;m;n)$$
$$PRC(t;t0;m;n)=\epsilon R_{us}(t;t0;m;n)-\epsilon\phi$$
$$s(t;t0;m)-\phi$$
$$u(t;t0;n)-\delta I(t;t0;m;n)--\delta T(t;t0;$$
$$m;n)-\delta\epsilon(t;t0;m;n)-\epsilon PR_{meas}(t;t0;m;n). \quad (6)$$

In a GPS network, the terms $\phi_u$ and $\delta\epsilon$ can be combined in a common offset $\phi_{net}'$ of network time with respect to GPS time. The pseudorange correction PRC, as determined by a network, can be written as $$PRC(t;t0;m;n)=\epsilon R_{us}'(t;t0;m;n)-\epsilon\phi_s'(t;t0;m)-\phi_{net}'(t;t0;m;n)--$$
$$\delta I'(t;t0;m;n)-\delta T'(t;t0;m;n), \quad (7)$$

where a prime on a variable on the right hand side indicates that the variable is to be determined with reference to a selected network reference point rather than to a user location.

Selective Availability (SA) induces errors in range and range rate calculations by dithering the clock that controls the carrier frequency and the code broadcast by a satellite, and by falsifying clock and ephemeris information being broadcast to allow calculation of the location and clock error of a satellite. The dither effects can change significantly in a few seconds, but the ephemeris information changes only with hourly page changes.

Clock dither and errors in the broadcast clock parameters affect all observers equally. Compensation for these terms can be combined into a single range term and a single range rate term for each satellite m. These compensation terms can be broadcast to all roving GPS units at a rate of approximately once per second.

Errors in the ephemeris (the satellite location) produce slowly varying errors in range. Compensation for these errors can be transmitted effectively as offsets for the calculated location of the satellite.

When the satellite clock is dithered by activation of Selective Availability, the term $\epsilon\phi_s'$ varies much more rapidly with time than do the other variables on the right hand side of equation (7). Because of the presence of this term, an RTCM SC-104 Type 1 message must be broadcast frequently, (for example, once per second or more often) so that the pseudorange correction terms PRC can provide effective correction for the clock dither created by Selective Availability. If the term $\epsilon\phi_s'$ is somehow removed, the required rate for update signals falls to a rate of the order of once per minute. If a new variable $$F_{noclock}(t;t0;m;n) = PRC(t;t0;m;n) + \epsilon\phi_s'(t;t0;m) \quad (8)$$
$$= \epsilon R_{us}'(t;t0;m;n) - \phi_{net}'(t;t0;m;n) -$$
$$\delta I'(t;t0;m;n) - \delta T'(t;t0;m;n),$$

is formed, this new variable can be transmitted at the lower rate, because none of the terms on the right in equation (8) varies rapidly with SA-induced clock dither. A global network GPS user can obtain the high update rate PRC term from an RTCM Type 1 PRC message (automatically updated at relatively high rates) and calculate the high-rate clock correction term from the relation $$\epsilon\phi_s'(t;t0;m)=F_{noclock}(t;t0;m;n)-PRC(t;t0;m;n). \quad (9)$$

The only additional term that need be sent for clock correction purposes here is $F_{noclock}$, and this occurs at the more leisurely rate. This approach is thus more efficient than the conventional approach, which would require transmission of the separate or additional term $\epsilon\phi_s'$. The elevation angle of a satellite, viewed from the network reference point, may be too low for use by a navigator operating with the standard RTCM output signals from the network. In this event, the network may implicitly assign the term $F_{noclock}$ the value 0 and set $$PRC(t;t0;m;n)=-\epsilon\phi_s'(t;t0;m). \quad (10)$$

Each GPS satellite broadcasts a navigation message containing parameters from which the satellite's clock error and its location can be computed. The computed clock error and position of the satellite are used together with measured or modeled values for the tropospheric and Ionospheric time delays to transform equation (1) into a function of the user's antenna location and clock error. The difference between the measured pseudorange and the calculated pseudorange defined by equation (1) is an equation in four unknown variables: three components of the user antenna spatial location and the clock error of the user's receiver/processor. Simultaneous measurements for each of four or more satellites produce a set of four or more equations to be solved for these four unknown variables. A complete solution for the pseudorange is given in Appendix A of "Reference Trajectories from GPS Measurements", James E. Robbins, Navigation, Journal of the Institute of Navigation, vol. 35 (1988) pp. 89–103. Approximate values of the user's spatial coordinates and clock error are often used to linearize the resulting four equations and to determine perturbations around these approximate solutions that satisfy the four equations. Errors in the parameters of a satellite navigation message and errors in the tropospheric and Ionospheric time delays produce errors in the user's location and clock offset, as derived from this process.

The difference between measured pseudorange at a reference station and calculated pseudorange from equation (1), using the known spatial coordinates of the reference station, is manifested by a composite measurement error in the calculated pseudorange caused by parameter errors in the satellite navigation message, and by errors in compensation for the tropospheric and Ionospheric time delays. Differential GPS computation is implemented by distributing corrections to these navigation message errors (pseudorange correction messages) to users who apply such corrections to the measured/calculated pseudorange differences before the user spatial coordinates are determined. Differential GPS correction is described in detail below.

Applying DGPS Corrections

Differential corrections are obtained as differences between GPS measurements and estimates of the corresponding quantities, calculated from known or modeled values for the elements. A mobile GPS receiver near a DGPS reference station can use the pseudorange correction (PRC) determined at that DGPS reference station to modify or correct the mobile GPS receiver's own pseudorange equations to compute more accurate spatial location and time coordinates. However, the DGPS corrections for a DGPS reference station become less and less accurate for the mobile GPS receiver as the distance between the mobile GPS receiver and the DGPS reference station increase. The DGPS corrections from a DGPS reference station become quite inaccurate at distances of 200 km or more (for pseudoranges) and at distances of 30 km or more (for carrier phases). This degradation in accuracy with increase in distance from a DGPS reference station arises in large part because the tropospheric and Ionospheric paths differ for GPS signal propagation from a given satellite to the reference station and to the mobile station, and because of the different aspect angles for line of sight from the reference station and from the mobile station to that satellite.

In the format defined by the RTCM SC-104 standards, the tropospheric and Ionospheric propagation time delays are not modeled so that the pseudorange corrections within each GPS receiver must compensate for the total effects of these tropospheric and Ionospheric propagation time delays.

When the same models for tropospheric time delays and Ionospheric time delays are used for both the DGPS reference station and the mobile GPS receiver, the contributions to pseudorange errors of each of these time delays become smaller, because these contributions arise only from differences between the actual and the modeled time delays. Use of pseudorange corrections for a mobile GPS receiver, based on these corrections at a DGPS reference station, may have acceptable accuracy for mobile GPS receiver and DGPS reference station separation distances of several hundred kilometers.

A Virtual DGPS Reference Station

A virtual reference station (VRS) is a reference station that generates pseudorange correction (PRC) information without having a surveyed location. Instead, the virtual reference station is given a stated location and pseudorange corrections (PRC) are generated as if a real reference station was placed at the stated location. The pseudorange correction (PRC) information of a virtual reference station is generated by combining satellite correction information from several real DGPS reference stations with the stated position for the desired virtual reference station. A virtual reference station converts satellite error corrections into a standardized DGPS correction format and broadcasts the DGPS correction information in the standardized format. In one embodiment, the standardized DGPS correction information is transmitted in the RTCM-104 format.

A virtual reference station can be implemented at any position where the satellite information from at least three real reference stations can be delivered. For example, a virtual reference station can be implemented at a central computer system where satellite error corrections are collected. Alternatively, a virtual reference station can be implemented at a remote location or at a roving GPS unit that moves with the user provided the satellite error correction information can be transmitted to the roving GPS unit.

Figure 3A:
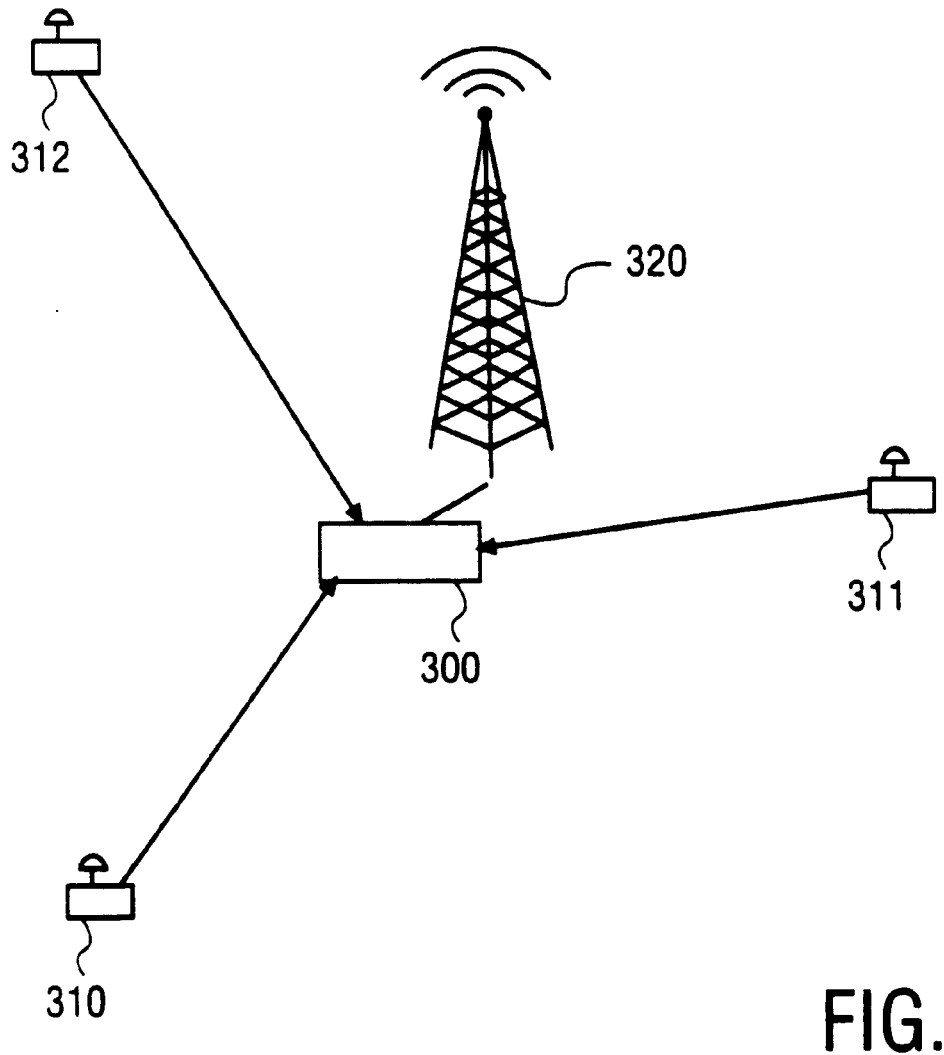
FIG. 3A illustrates a central computer system that collects error corrections from three DGPS reference stations and processes the correction information to broadcast error correction information that simulates a DGPS reference station.

FIG. 3A illustrates a first virtual reference station embodiment. In the embodiment of FIG. 3A, satellite observation information from several real DGPS reference stations is transmitted to a central processing computer 300. Each real DGPS reference station sends the satellite error correction information for the satellites that it can observe. The central processing computer 300 receives all the satellite error corrections from all the real DGPS reference stations 310, 311, and 312. Using all the satellite measurement information, the central processing computer determines the pseudorange corrections for that would be generated by a reference station at the computer's location and broadcasts the pseudorange corrections from radio antenna 320 on a suitable radio frequency.

Figure 3B:
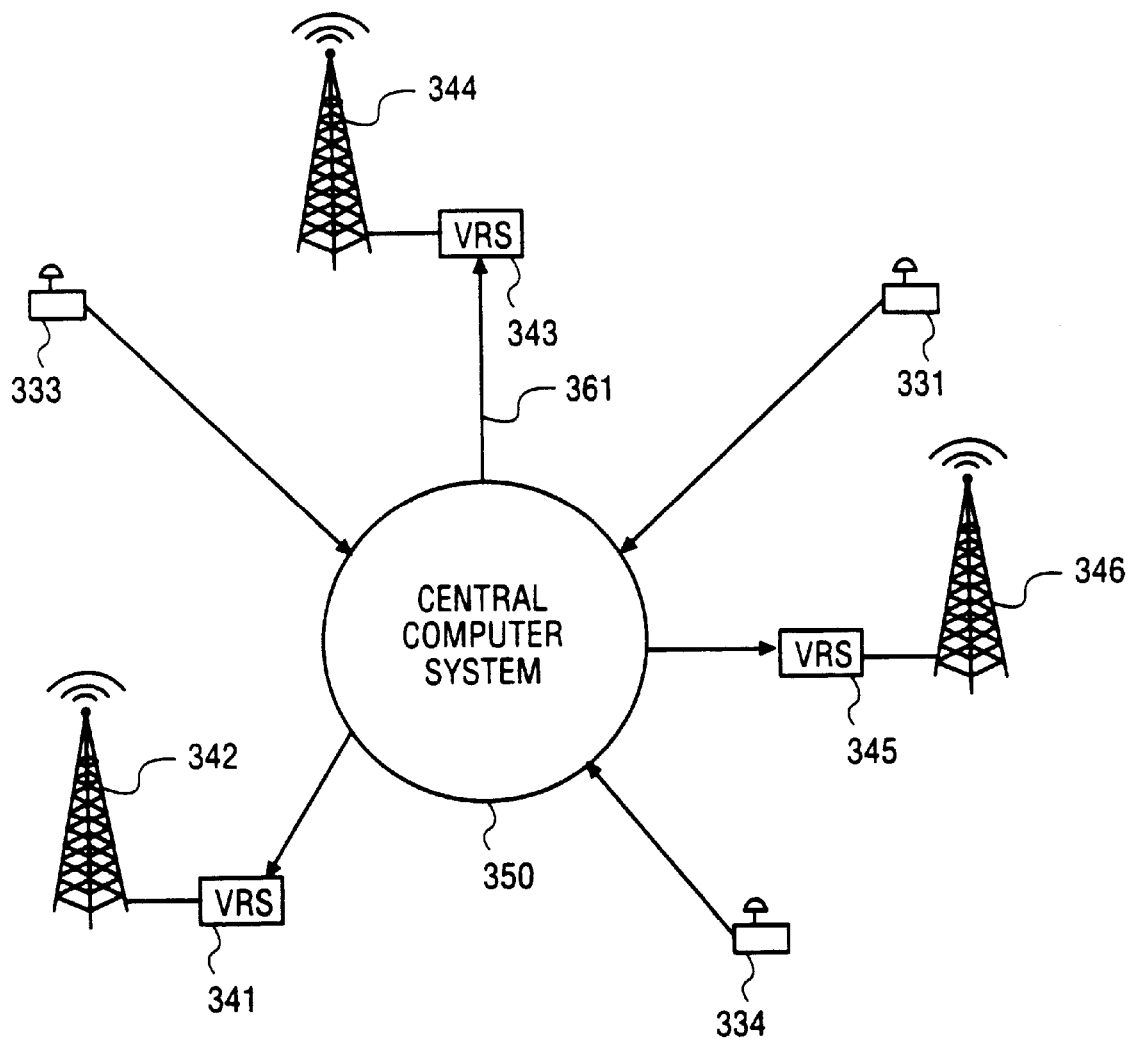
FIG. 3B illustrates a central computer system that collects error corrections from three DGPS reference stations, processes the correction information, and passes the processed data to remote virtual reference stations.

FIG. 3B illustrates a second virtual reference station embodiment. In the embodiment of FIG. 3B, a plurality of virtual reference stations 341, 343, and 345 are implemented at locations remote from the network central station 350. The virtual reference stations may be stationary or the virtual reference stations may be mobile. In a primitive embodiment, the information transmitted to the virtual reference stations from the central computer 350 may be the DGPS error correction messages that are received by the central computer system and then immediately rebroadcast to the individual virtual reference stations. However, in a preferred embodiment, the DGPS error corrections received from each real DGPS reference station are processed by the central computer system 350 and the processed information transmitted to the virtual reference stations. By processing the general DGPS error corrections at the central computer system 350, the information transmitted to the individual virtual reference stations can be in a format that simplifies the generation of pseudorange corrections at the individual virtual reference stations.

Using the information transmitted from the central computer system 350, the individual remote virtual reference stations generate and broadcast pseudorange corrections to the mobile GPS receivers in the local area. Thus, each remote virtual reference station may serve one or many local GPS receiver users that are sufficiently dose to that virtual reference station that the DGPS pseudorange corrections broadcast by the virtual reference station can be used as if the local user were located at that virtual reference station site.

Calculating the Virtual DGPS Reference Station Corrections

Each stationary virtual reference station is assigned a position. The position of the stationary virtual reference station may be stored in a permanent file. Mobile virtual reference stations have a continually updated virtual reference station position. Both stationary and mobile virtual reference stations calculate local error corrections for the visible satellites using the satellite ephemeris information received from a central computer system and the current virtual reference station position. To calculate local error corrections for the visible satellites, each virtual reference station must compensate for several factors.

The errors caused by satellite clock offset and the receiver clock offset vary temporally, but not with the location of the receiver. Thus, the DGPS corrections based upon clock offsets are the same for all reference stations no matter where they are located. Therefore, the portion of the DGPS corrections based upon clock offsets will be the same for virtual DGPS reference stations as it is for real DGPS reference stations.

Figure 4:
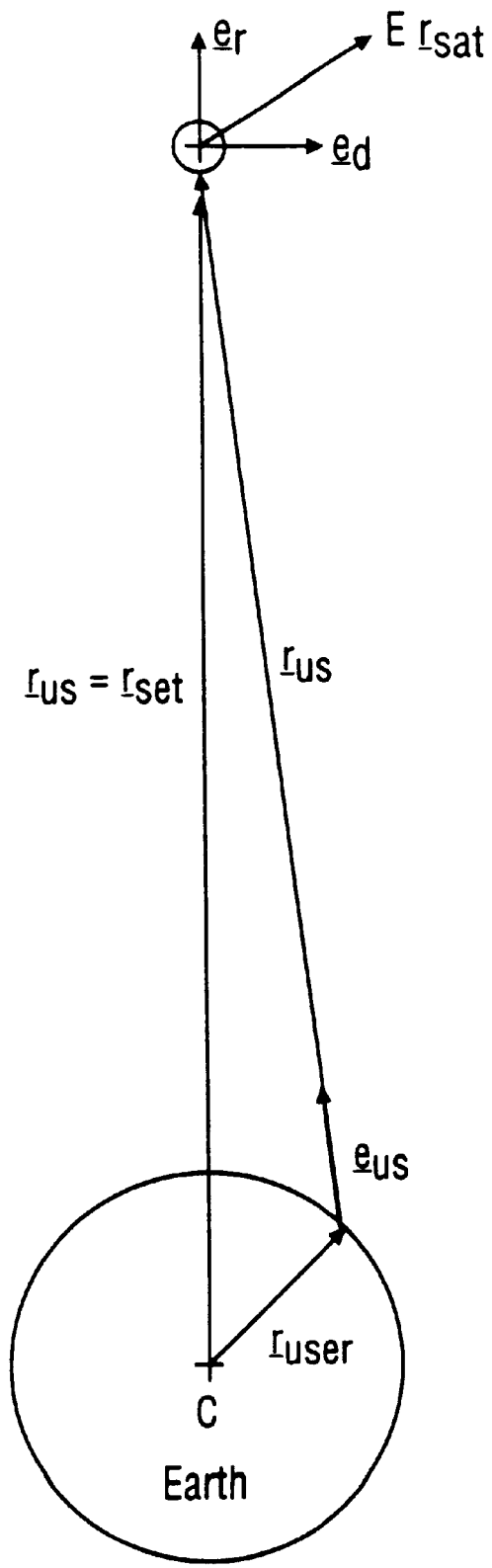
FIG. 4 illustrates the Earth-Centered Earth-Fixed coordinate system.

The spatially varying portion of a pseudorange correction is more difficult to determine for a virtual reference station. The spatially varying portion of a pseudorange correction is expressed as a sum of three components, which are computed individually in a global format, to compensate for (1) errors in the computed satellite location, (2) errors in estimated tropospheric time delays and (3) errors in estimated Ionospheric time delays. This approach relies on a tropospheric time delay model, an Ionospheric time delay model, and a real time calculation of the components of a three-dimensional satellite error vector ($\epsilon r_{sat}$) that defines the difference from a computed satellite location and an actual satellite location, as a function of time. FIG. 4, which is not drawn to scale, illustrates the components of the satellite range error $\epsilon r_{sat}$ in the radial direction and in an orthogonal plane defined by the down-plane and cross-plane directions.

Tropospheric time delay is modeled using a well-known non-proprietary model based on exponential decay of the zenith component of this delay with increasing altitude. Tropospheric time delay is modeled by dividing the zenith component by the sine of the satellite elevation angle, measured at the GPS station location. This model provides a global format for calculating the Tropospheric time delay.

Ionospheric time delay is computed using a single-frequency model for GPS. This model is summarized in the "Navstar Interface Control Document", ICD-GPS-200, published by Rockwell International Corporation, Satellite Division, Revision B, Jul. 3, 1991. The material from the Navstar Interface Control Document is incorporated by reference herein. The required parameters for this model are broadcast by the GPS satellites. Reference station measurements of Ionospheric time delay may be used to calculate improved values of these model parameters, which are then distributed by the network. A single frequency GPS station can use the single frequency model, with parameters supplied by the GPS satellites or by the network. A double frequency GPS station can use this single frequency model, or the station can measure and determine the Ionospheric time delay using a two-frequency model, such as that disclosed in the ICD-GPS-200 document, op cit.

After the tropospheric and Ionospheric time delays have been compensated for, the spatially varying portions of the pseudorange corrections from each reference station are Kalman-filtered to estimate components of the satellite error vector $\epsilon r_{sat}$. Mutually perpendicular radial, down-plane and cross-plane vector components can be computed, and the vector can be transformed to Earth-centered, Earth-fixed (ECEF) coordinates for distribution to the GPS mobile stations, if desired.

A mobile GPS receiver may determine the components of a unit vector that points from the mobile GPS receiver to each of the GPS satellites. The scalar or dot product of this unit vector with the satellite error vector $\epsilon r_{sat}$ produces the component of pseudorange correction required to compensate for satellite location error at the mobile station location. Use of the global ECEF coordinates for satellite location correction (the satellite error vector $\epsilon r_{sat}$ for each satellite), a common clock correction model and the global formats of the tropospheric and Ionospheric time delays provides a global format for computing and distributing parameters used for pseudorange corrections at any location. Thus, provided that common clock correction information and the satellite error vector $\epsilon r_{sat}$ for each satellite is available, the pseudorange corrections PRC for any location can be generated. This format is appropriate for regional networks of unlimited area; that is, the network may cover the entire Earth including regions of space near the Earth's surface. (Within 100,000 feet of the Earth's surface.)

To determine the satellite error vector $\epsilon r_{sat}$ for a particular satellite, measurements of that satellite from at least three different real reference stations are required. Methods of determining the satellite location error vector $\epsilon r_{sat}$ are known in the art. For example, Patent Cooperation Treaty publication WO 95/18977 titled "A network For Code Phase Differential GPS Corrections" published Jul. 13, 1995 explains how the satellite error vector $\epsilon r_{sat}$ can be determined if independent satellite observations from three different real reference stations are available. Thus, in the present invention, the central computer system can combine the satellite observations from three different real reference stations in order to generate the satellite error vector $\epsilon r_{sat}$. Furthermore, if measurements from additional DGPS reference stations are available, the measurements of these additional reference stations can be used for consistency checks on the measurements from three reference stations that are used to determine the satellite location error vector $\epsilon r_{sat}$.

For each virtual reference station, the unit vector $e_{us}$ is computed using ephemeris information from the network and the stated virtual reference station location. Then, the unit vector $e_{us}$ is used to perform the dot product $e_{us} \cdot \epsilon r_{sat} \approx \epsilon R_{us}$ to determine the component of pseudorange error $\epsilon R_{us}$ at the virtual reference station location due to satellite location error. Because the correction vector $\epsilon r_{sat}$ varies slowly, the message containing this part of the pseudorange correction can be sent less frequently than other parts of the message. The satellite location correction message must contain an Issue Of Data Ephemeris (IODE) label to relate this to the IODE of the satellite navigation message so that users can properly use the corrections. Corrections for the satellite clock error, to compensate for Selective Availability (SA) clock dither and other disturbances, must be transmitted rapidly.

In the RTCM SC-104 format, the Type 1 or Type 9 messages carry the clock corrections, combined in the pseudorange correction with location-dependent corrections for the location transmitted in a Type 3 message. In an embodiment that only uses RTCM SC-104 formatted PRC messages, the virtual reference station uses these messages and the term $F_{noclock}$ extracted from auxiliary messages to calculate the satellite clock error value $\epsilon \phi_s'$ as set forth in equation (9).

Alternatively, if other data formats are used to build the virtual reference station network, then the satellite clock error value $\epsilon \phi_s'$ can be transmitted directly to the virtual reference stations. In such an embodiment, the auxiliary message term $F_{noclock}$ would not be necessary.

The azimuth angle A and the elevation angle E are used in calculations of the tropospheric time delay δT and the Ionospheric time delay δI. These angles can be calculated for an virtual reference station by using the vector $e_{us}$ for that virtual reference station. The unit length vector $e_{us}$ is expressible in a local (east, north, up) coordinate system as $$e_{us} = e_{east} \cos E \sin A + e_{north} \cos E \cos A + e_{up} \sin E. \quad (25)$$

The tropospheric time delay δT for signal propagation from the satellite to the virtual reference station location is calculated by the same model that is used for the network central station, which is $$\delta T(t;t0;m;n) = \delta T_0 \exp(-h_u/h_s) \csc E, \quad (26)$$

where $h_u$ is the altitude of the virtual reference station location and $\delta T_0$ and $h_s$ are model parameters. These model parameters can be constants or may be time-varying variables obtained from the central computer system of the virtual reference station network.

The Ionospheric time delay δI for signal propagation from the satellite to the virtual location is calculated using the same model that is used for the network central station. A Type 59 RTCM message may be used, together with the model for single frequency users set forth in Section 2.4.4.3 Ionospheric Model, Global Positioning System Standard Positioning Service, OASD (C31)/T&TC3, 6000, Defense Pentagon, Washington, D.C. 20301-6000, incorporated by reference herein. The RTCM Type 59 message broadcast by the network central station for the Ionospheric time delay model contains a set of the four alpha parameters and the four beta parameters used in the model, plus an additional term to be applied for time delay in the vertical direction ("up" in equation (25)) before the obliquity calculation is performed. Additional time data are used to augment the RTCM time tag to provide both time of day and date. The virtual reference station location, satellite location, satellite azimuth and elevation relative to the virtual reference station location, the time of day and the extended model parameters for the Ionospheric time delay model are then used to compute the Ionospheric time delay for signal propagation from the satellite to the virtual reference station location.

The complete RTCM SC-104 pseudorange corrections at any virtual reference station location can be calculated using the relation:

$$PRC(t;t0;m;n)_{VRS} = \epsilon R_{us}(t;t0;m;n) - \epsilon \phi_s(t;t0;m) - \delta I(t;t0;m;n) \delta T(t;t0;m;n). \quad (27)$$

With appropriate coverage of the region S with real GPS reference stations, this embodiment may be used for a region S that is as large as the entire Earth. The RTCM SC-104 format is used here for illustration, but the invention is not limited to this format as the initial communication format. Any appropriate communication format can be used for the embodiments discussed here.

Building a Virtual Reference Station Infrastructure

Figure 5:
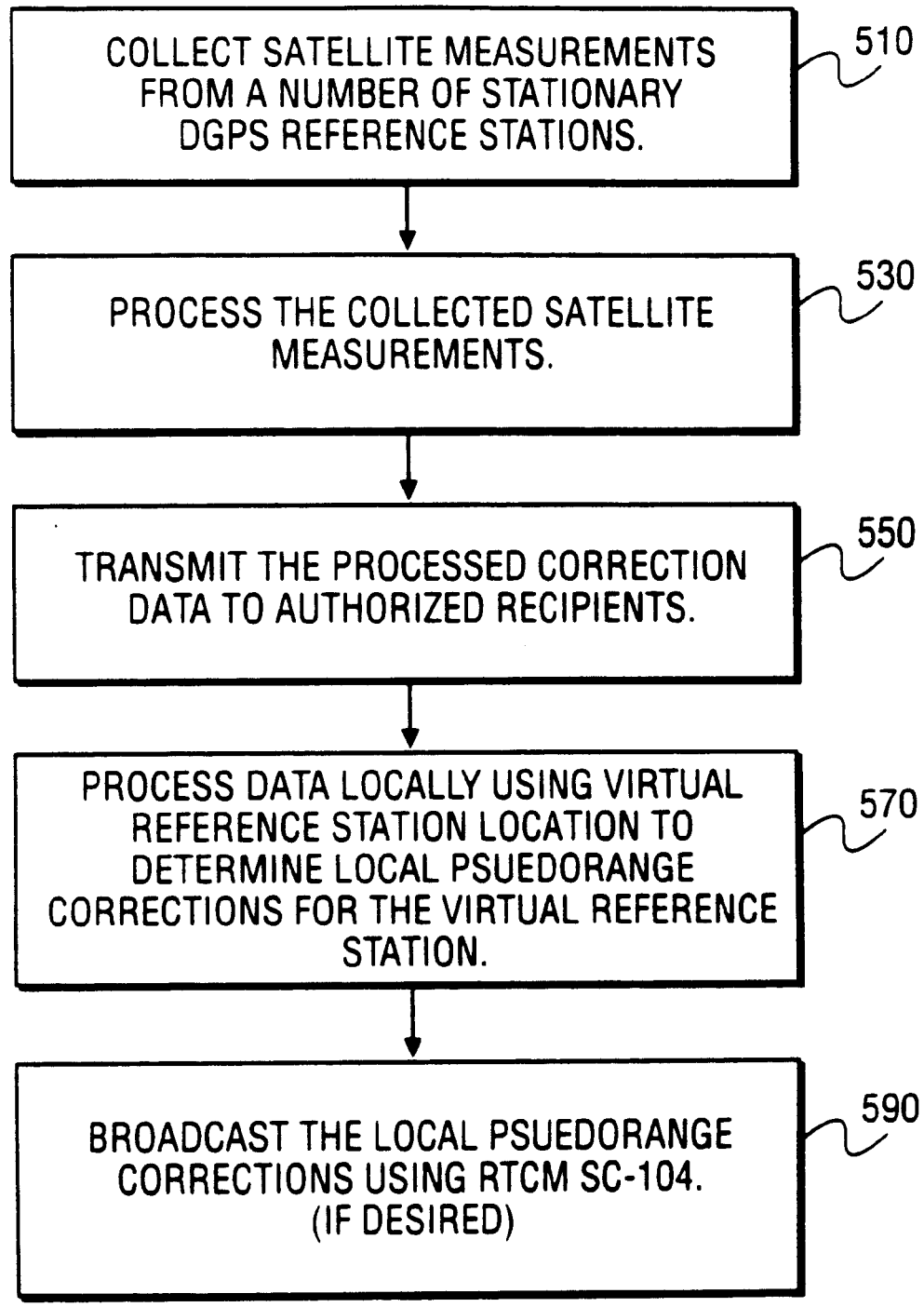
FIG. 5 illustrates a flow diagram describing how virtual reference stations are implemented.

FIG. 5 illustrates the four main steps to implement a virtual reference station. The first step (step 510) is to collect satellite measurements from a number of stationary DGPS reference stations that are positioned at accurately known locations. The satellite measurements may be transmitted in RTCM SC-104 error corrections or the measurements may be transmitted as raw pseudorange measurements. To protect the infrastructure investment, the satellite measurements are encrypted before being transmitted to the central computer.

After all of the satellite measurements have been collected, the satellite measurements can be processed at a central location at step 530. (Alternatively, no processing may be performed but in a preferred embodiment, the measurements are processed.) For each satellite wherein three or more independent measurements are available, the satellite error vector $\epsilon r_{sat}$ can be generated at the central location. The satellite error vector $\epsilon r_{sat}$ specifies the error between the ephemeris transmitted by the satellite and the true ephemeris of the satellite. Furthermore, a satellite clock error can be determined for each satellite using the various measurements collected.

After processing the satellite measurements, the processed satellite information is then transmitted to authorized recipients at step 550. In one embodiment, the processed satellite information consists of the satellite error vector $\epsilon r_{sat}$ and the satellite clock error for each satellite for which at least three measurements are available. The authorized recipients are recipients that have paid to receive the processed information such that the authorized recipient can implement a virtual reference station. In a preferred embodiment, the processed satellite information is transmitted in an encrypted form across the global Internet such that the recipient must decrypt processed information. All authorized recipients will have decryption keys that will allow the authorized recipients to decrypt the processed information. In one embodiment, encrypted processed satellite information is transmitted across the global Internet using the Internet multicast backbone (MBONE).

At step 570, the processed information is further processed at each local virtual reference station to determine the local pseudorange corrections at each virtual reference station location. During local processing, the location of the virtual reference station is combined with the processed satellite information to generate local pseudorange corrections. The local pseudorange corrections can be used to correct local satellite measurements.

At step 590, the virtual reference station may broadcast the local pseudorange corrections on a radio frequency in accordance to the RTCM SC-104 format. By broadcasting the local pseudorange corrections, mobile DGPS receivers that are near the virtual reference station can correct local satellite measurements.

Figure 6:
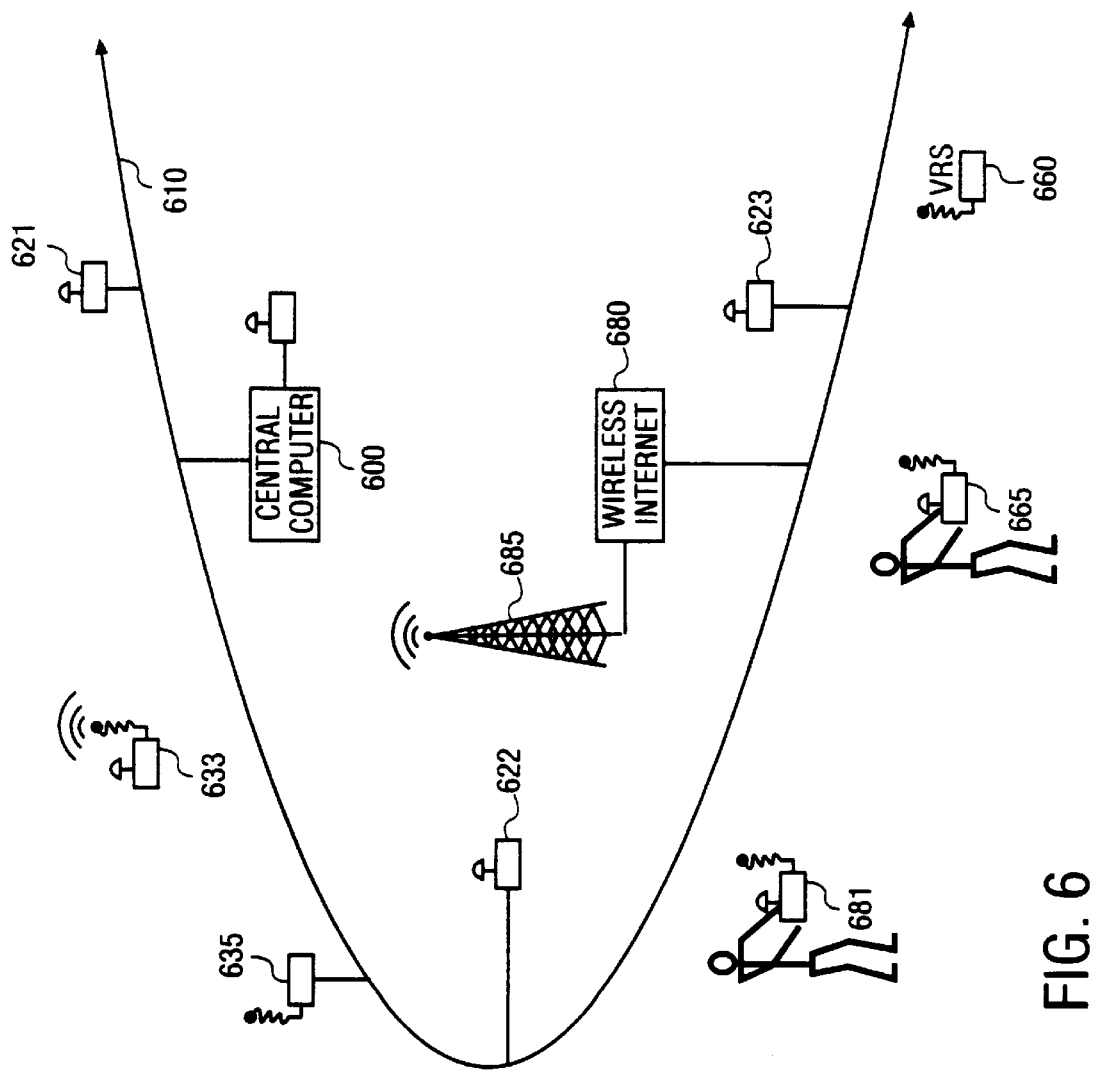
FIG. 6 illustrates several embodiments of virtual reference stations that are implement using the Internet.
Figure 7:
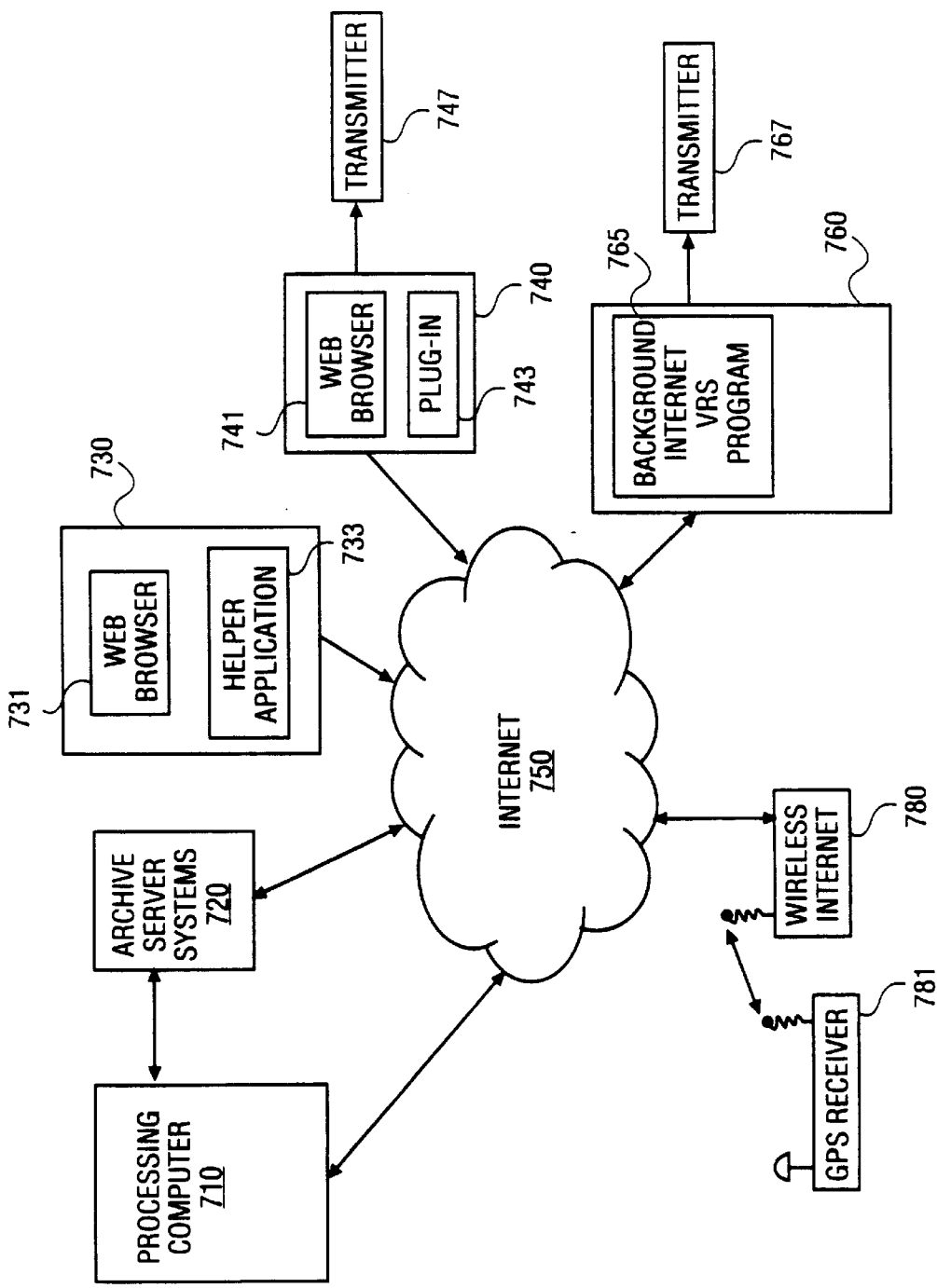
FIG. 7 illustrates an embodiment of a system that collects satellite information and then distributes that information to virtual reference stations using the Internet.

To build a virtual reference station infrastructure, the present invention introduces an Internet based virtual reference station network. FIGS. 6 and 7 illustrate how a virtual reference station network can be constructed using the global Internet.

FIG. 6 illustrates a conceptual diagram of a virtual reference station network built using the internet. As listed in FIG. 5, the first step in building a virtual reference station network infrastructure is to collect differential satellite measurements from a number of real DGPS reference stations at different locations. The location of each real DGPS reference station is accurately known such that difference between the satellites stated position and its real position can be measured. Each real DGPS reference station then transmits the differential correction terms to the central computer 600 as illustrated in the conceptual diagram of FIG. 6. To protect the investment in the infrastructure, the information transmitted to the central computer 600 is encrypted before transmission such that no unauthorized recipients receive the information.

One method of collecting the independent satellite measurements is to install a set of real differential GPS reference stations such as DGPS reference stations 621, 622, and 623 in FIG. 6. each of the DGPS reference stations 621, 622, and 623 are coupled to the global Internet 610. Each of the reference stations 621, 622, and 623 measures the observable satellites and then transmits the correction terms to the central computer station 600 across the Internet.

However, a less costly method of collecting DGPS correction information is to use the differential GPS reference stations that have already been installed by the Coast Guard, the North American Lighthouse operators, several Scandinavian countries, and anyone else. Referring again to FIG. 6, differential GPS reference station 633 may be a standard marine lighthouse reference station that is transmitting RTCM SC-104 standard differential GPS corrections on a marine radio beacon frequency. To capture the differential correction information broadcast by reference station 633, all that is needed is a radio receiver.

For example, referring to FIG. 6, a radio receiver 635 is placed within range of differential GPS reference station 633 such that the pseudorange correction information from differential GPS reference station 633 is received. The radio receiver 635 includes analog to digital circuitry for transforming the error corrections broadcast on the marine radio beacon frequency into a series of digital error correction values. The radio receiver 635 also includes computer network equipment that connects the radio receiver 635 to the central computer 600. In one embodiment, the computer network equipment comprises a connection to the global Internet. The radio receiver 635 can thereby receive error corrections from the reference station 633 and transmit the error correction information to the central computer 600 using the global internet 610. The error correction information is encrypted before transmission such that only the central computer 600 can use the information. Thus, a large number of observations from several independent DGPS reference stations can be obtained by placing a RTCM SC-104 radio receivers within the range of the existing real DGPS reference stations and then transmitting the received information to the central computer 600.

Once the central computer 600 has received the satellite error correction terms from several reference stations, the central computer 600 processes the satellite error correction terms as described in the previous sections. In a preferred embodiment, the central computer 600 calculates a satellite error vector ($\epsilon r_{sat}$) and a satellite dock error value ($\epsilon \phi_s'$) for each satellite for which there are error correction observations from at least three independent real reference stations. The central computer 600 can then transmit the satellite error vectors ($\epsilon r_{sat}$) and a satellite clock error values ($\epsilon \phi_s'$) to the virtual reference stations. The transmitted satellite error vectors ($\epsilon r_{sat}$) and a satellite clock error values ($\epsilon \phi_s'$) are encrypted before transmission to ensure that only authorized recipients receive the information. To reduce the amount of information that needs to be transmitted to a particular virtual reference station, the central computer 600 may only transmit the satellite error vectors ($\epsilon r_{sat}$) and a satellite clock error values ($\epsilon \phi_s'$) for satellites that are observable by each particular virtual reference station.

FIG. 6 illustrates two examples of sending the information to local virtual reference stations. A first example is illustrated with reference to virtual reference station 660. Virtual reference station 660 is a virtual reference station that is coupled directly to the global internet 610. Furthermore, virtual reference station 660 has an assigned location. Using the assigned virtual reference station location, virtual reference station 660 further processes the information in order to generate local pseudorange correction (PRC) information. Once the local PRC information is generated, that local PRC information is broadcast to users in the local area.

In one embodiment, the local PRC information is transmitted in accordance to the RTCM SC-104 standard. For example, local user 665 with a mobile GPS receiver that can receive PRC corrections transmitted in the RTCM SC-104 format from the virtual reference station 660.

An alternate method of distributing the processed satellite error vectors and satellite clock errors is illustrated with reference to items 681 and 685 in FIG. 6. In some areas of the country, wireless Internet service is available. FIG. 6 illustrates a wireless internet service provider that is coupled to the normal wired Internet. The wireless internet provider transmits and receives internet information for wireless transceivers as illustrated by the transmitting antenna 685. An example of a wireless internet information provider is the Ricochet system by Metricom (http://www.metricom.com/). Metricom's Ricochet system uses a network of small packet radio receiver transmitter systems. When there is a wireless internet system, a GPS receiver such as GPS receiver 681 can communicate directly with the central computer system 600 to obtain correction information. Thus, the GPS receiver 681 can receive information from the satellites to generate an approximate position and then that approximate position can be used to generate information as if a virtual reference station were at that same location. Using its approximate location, the GPS unit 681 can generate its own DGPS correction information from the information received from central computer 600.

Referring to FIG. 7, two implementations of receiving real time corrections information from a central processing computer 710 is illustrated. A first virtual reference station is illustrated with reference to computer system 740 and transmitter 747. Computer system 740 is coupled to the global internet 750. Using a web browser 741, a user of the personal computer system 740 can contact a web server implemented by processing computer 710. The web browser is used to gain access to the proper information on the web server at the processing computer 710. Once accesses are achieved, the information will be transmitted to the computer system 740 and interpreted by a plug-in application 743. The plug-in application 743 interprets the real time differential GPS information and processes it in order to generate local pseudorange corrections. The local pseudorange corrections are then passed to transmitter 647 and broadcast to receivers in the local area.

An alternate virtual reference station implementation is illustrated with reference to computer system 760 and transmitter 767. In the embodiment illustrated in computer system 760, a background internet virtual reference station program is running. A background internet virtual reference station program 765 accesses a server in the processing computer 710 in order to retrieve a stream of real time satellite error corrections. The background internet virtual reference station program 765 then processes the stream locally in order to generate local PRC corrections. The PRC corrections are then broadcast on the transmitter 767. By using a background application, the computer system 760 can be used by a user for another purpose.

As illustrated in the previous section, a mobile GPS receiver that has access to the Internet can use the correction information directly. An example of this is illustrated with reference to mobile GPS receiver/computer system 781 and wireless internet provider 780. The GPS receiver/computer 781 communicates directly with a processing computer 710 in order to access processed satellite measurement information. The GPS receiver/computer 781 then generates corrections by applying the satellite measurement information to the approximate position determined from the satellites. The wireless internet service provider 780 is merely used as a conduit in order to obtain wireless access to the processed satellite measurement information in the processing computer 710.

The system illustrated in FIG. 7 can also be used to perform DGPS post-processing. An example of this is illustrated with reference to computer system 730. A web browser 731 on computer system 730 accesses an archive server system 720 through the global internet 750. The archive server system stores an archive of GPS correction information generated by the processing computer 710. The web browser 731 is used to transmit a certain time for which correction information is required. The correction information is retrieved from the archive server system 720 and passed to a helper application 733. The helper application then corrects the unprocessed GPS position data on the computer system 730.

An Example Usage Of A Virtual Reference Station

Figure 8:
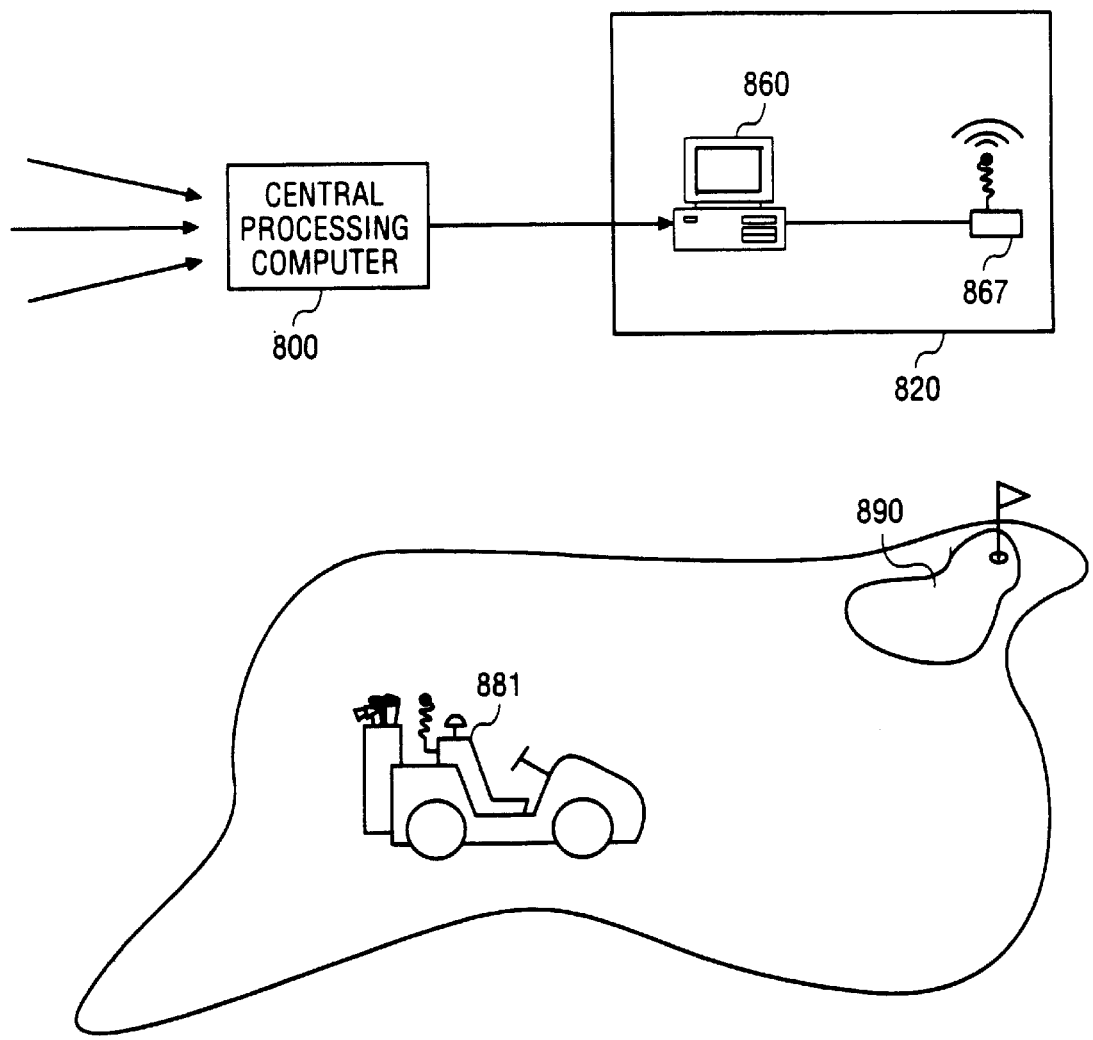
FIG. 8 illustrates an example use of a virtual reference station at a golf course.

FIG. 8 illustrates an example use of a virtual reference station based on the virtual reference station network. As illustrated in FIG. 8, a central processing computer 800 receives several differential GPS observations from several real GPS reference stations. The central processing computer 800 then processes these differential GPS observations. The processed satellite observations can be made available on the global Internet on a for-fee basis. To enforce the fee arrangement, the processed satellite observations are encrypted before being transmitted on the global Internet. To decrypt the processed satellite observations, a recipient must pay a fee to obtain a decryption key.

A personal computer system 860 located at a club house 820 of a golf course can contact the central processing computer 800 through the Internet. In an alternate embodiment, the personal computer system 860 may verify that it is an authorized recipient of information using an account number and password. The personal computer system 860 then receives real time processed satellite measurement information from the central processing computer 800.

The personal computer system 860 receives the processed satellite information and further processes the information by using a local position to generate local virtual reference station corrections. In a preferred embodiment, the local corrections would be formatted as standard RTCM SC-104 pseudorange corrections (PRC). This pseudorange correction information is passed to a transmitter 867 that transmits the local correction information to recipients on the golf course. Thus, the personal computer system 860 and transmitter 867 implement a virtual reference station.

Local GPS receivers, such as a GPS receiver implemented on a golf cart 881, can receive position information from the visible GPS satellites to determine an approximate position. However, if a DGPS receiver is placed on the golf cart 881, then the DGPS receiver can combine the pseudorange corrections from the virtual reference station with the satellite measurements in order to generate an extremely accurate position. If the receiver on the golf cart 881 knows the exact positions of the golf pins are, then the GPS receiver on the golf cart 881 can determine the exact yardage from the golf cart to the pin 890 thus, simplifying club selection.

To implement a system such as the golf system illustrated in FIG. 8, all that is needed are standard DGPS receivers for the golf carts 881, a personal computer 860 to receive the processed satellite measurement information and generate the virtual reference station corrections, and a transmitter 867 for transmitting the virtual reference station corrections. Most organizations such as a golf course will already have a personal computer 860 that it used to perform operations such as accounting and database management. The same personal computer system can be used to run a background application that generates the virtual reference station corrections and transmits those on the transmitter 867. Thus, extremely accurate DGPS information can be generated locally only for the additional cost of a transmitter 867.

Providing WAAS Like Corrections Using A Server On The Internet

Figure 9:
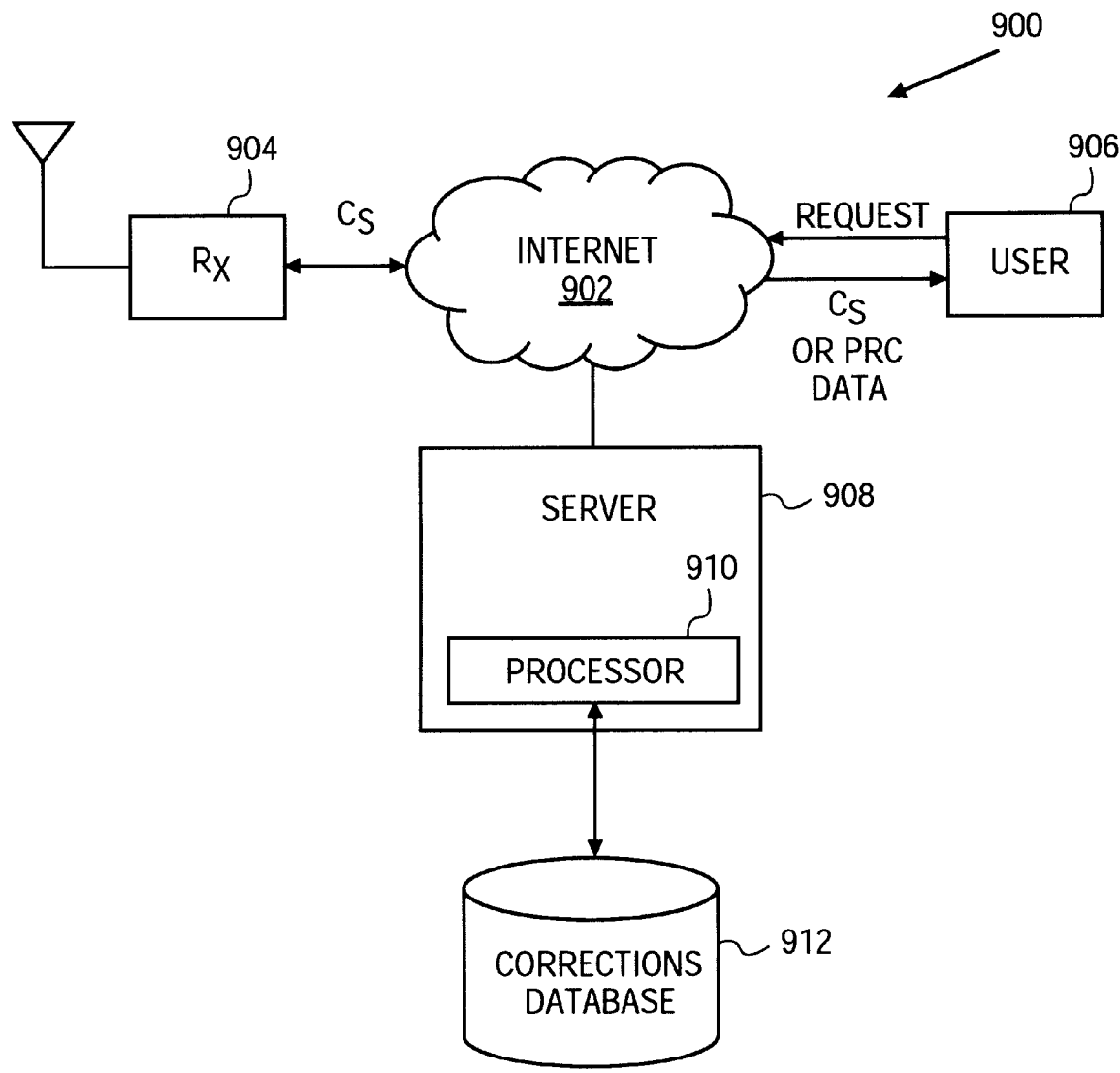
FIG. 9 illustrates an embodiment of a system that provides WAAS like corrections using a server and processor on the Internet.

FIG. 9 illustrates an embodiment of a system 900 providing WAAS like corrections using a server 908 on the Internet 902. WAAS like corrections refer to satellite position error corrections, which provide more accurate emphermerities for a given location within a region of a network. Like WAAS, the example of FIG. 9 provides corrections for a broad and wide range of area because of the extended communication capabilities of the Internet.

Referring to FIG. 9, a receiver ($R_x$) 904, server 908, and user 906 are illustrated as being interconnected via the Internet 902. Receiver 904 collects satellite measurement data or information from a plurality of satellites (not shown). Satellite measurement data or information refers to data derived from a measurement of a pseudorange. Satellite measurement data or information can also refer to satellite position information, which includes ephemeredes, satellite clock error data, or other like satellite derived data or information. Receiver 904 computes and calculates satellite position error corrections ($C_s$) based on the collected satellite measurement information. Receiver 904 transmits $C_s$ corrections to server 908 via the Internet 902. Receiver 904 can transmit $C_s$ corrections to server 908 via a wired or wireless medium. In one embodiment, receiver 904 is a DGPS reference station that provides correction information to server 908.

Server 908 includes a processor 910. Server 908 uses processor 910 to process the $C_s$ corrections from receiver 904. In one embodiment, processor 910 stores received $C_s$ corrections in a corrections database 912. As such, processor 910 can process the stored $C_s$ corrections at a later time ("post-processing") and provide local pseudo range corrections (PRC) based on the stored $C_s$ corrections to a user. In another embodiment, server 908 uses processor 910 to transmit received $C_s$ corrections to user 906 in a real time manner without storing the $C_s$ corrections. For example, processor 910 can transmit $C_s$ corrections in a RTCM 104 format to user 906.

User 906 can be a mobile computing device or a fixed computing device for receiving GPS signals. For example, user 906 can receive RTCM 104 data or WAAS like corrections. In one embodiment, user 906 requests from server 908 to send $C_s$ corrections directly as a RTCM 104 data stream in real-time manner. In one embodiment user 906 can process the $C_s$ corrections itself. In another embodiment, user 906 can request from server 908 to calculate and provide PRC corrections at a given location based on the stored $C_s$ corrections. For instance, user 906 can request PRC corrections for a time $T_i$ at a specific location (A, B, C) from server 908. The time $T_i$ for the PRC corrections can be, e.g., a day earlier from the time of the request or the time the satellite measurement data was collected for the $C_s$ corrections. That is, receiver 904 can collect satellite measurement data and compute $C_s$ corrections, which can be stored in corrections database 912 and used at a later time.

In a particular example, receiver 904 can be located in California and user 906 can be located in St. Louis, Mo. Server 908 can also be located in Chicago, Ill., which can receive and store $C_s$ corrections from receiver 904 in corrections database 912. Thus, user 906 can thus use $C_s$ corrections in St. Louis even though the $C_s$ corrections were collected and computed in California and even if the $C_s$ corrections were collected and computed at an earlier time. Such an example allows measurement data to be collected and used to compute WAAS like corrections anywhere in the United States for use by a GPS device having Internet access capabilities.

Figure 10:
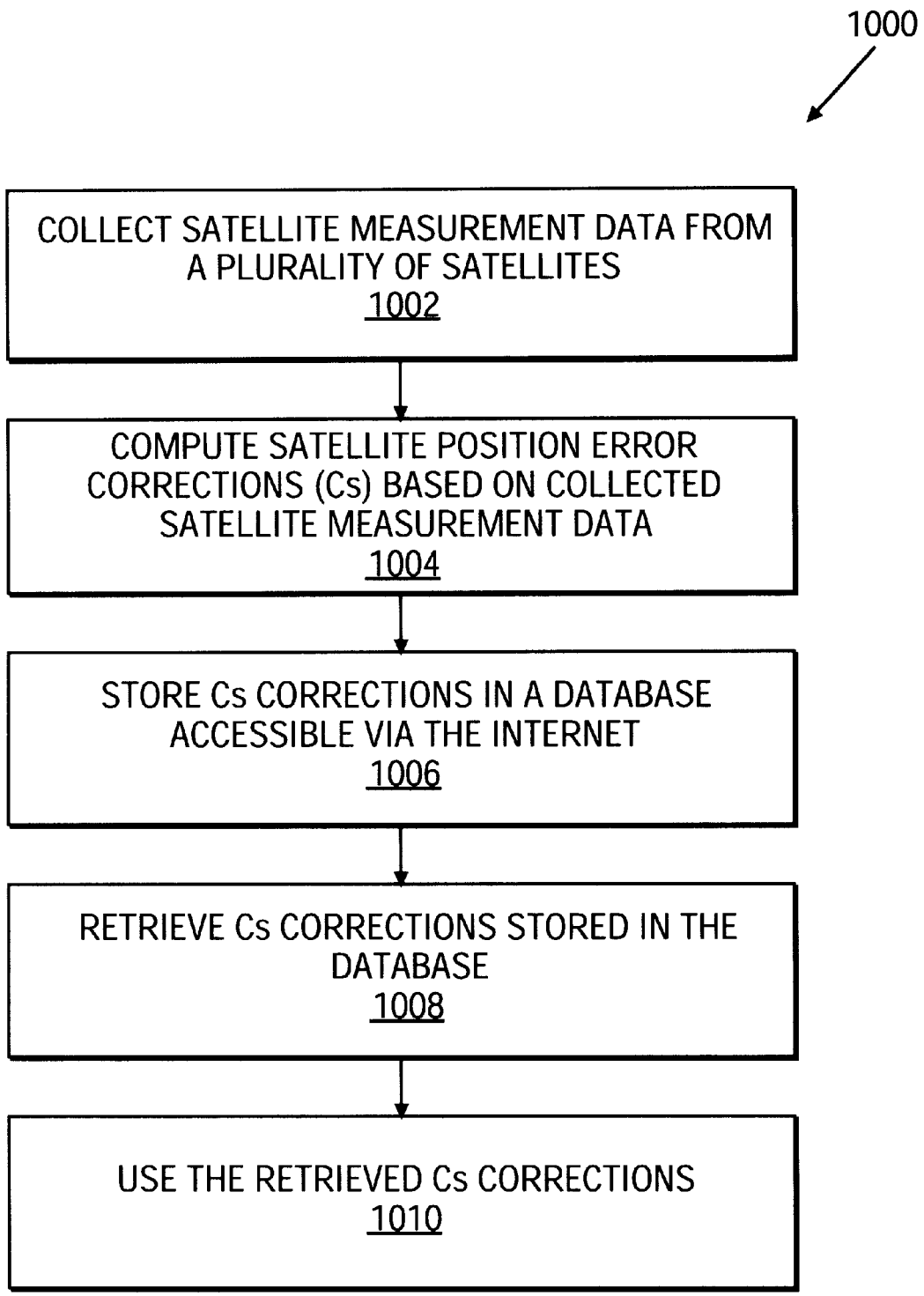
FIG. 10 illustrates one embodiments of a flow diagram for a process to use satellite position error corrections.

FIG. 10 illustrates one embodiment of a flow diagram for a process 1000 to use satellite position error corrections $C_s$. Initially, process 1000 begins at step 1002.

At step 1002, satellite measurement data is collected from a plurality of satellites. For example, receiver 904 can collect the satellite measurement data.

At step 1004, satellite position error corrections ($C_s$) are computed based on the collected satellite measurement data. Receiver 904 can compute the $C_s$ corrections and transmit the $C_s$ corrections to server 908.

At step 1006, the $C_s$ corrections are stored in a database accessible via the Internet. For example, server 908 can receive the $C_s$ corrections from receiver 904 and store the $C_s$ corrections in corrections database 912.

At step 1008, the stored $C_s$ corrections are retrieved.

At step 1010, the retrieved $C_s$ corrections are used. In one embodiment, processor 910 retrieves the $C_s$ corrections to compute PRC corrections, which are then sent to user 906. For example, user 906 can request server 908 to calculate PRC corrections based on a given location. In another embodiment, user 906 requests server 908 to send directly stored $C_s$ corrections, which are then processed and used by user 906.

Thus, such a process allows WAAS like corrections to be used for "post-processing" in a large and wide area instead of a localized area for a GPS device having Internet access capabilities.

Thus, a method and system for providing WAAS like corrections using a server on the Internet have been described. In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A Global Positioning System (GPS) method comprising:

collecting satellite measurement data;

computing satellite position error corrections using the collected satellite measurement data;

storing the computed satellite position error corrections;

retrieving the stored satellite position error corrections; and using the retrieved satellite position error corrections.

2. The method of claim 1, further comprising:

transmitting the computed satellite position error corrections to a server via a network.

3. The method of claim 2, wherein the network includes an Internet network.

4. The method of claim 2, further comprising:

receiving a request from a user connected to the network to compute pseudo range corrections for a given location by the server using the stored satellite position error corrections;

processing the stored satellite position error corrections to compute the pseudo range corrections by the server; and transmitting the computed pseudo range corrections to the user by the server via the network.

5. The method of claim 2, further comprising:

receiving a request from a user connected to the network to send the stored satellite position error corrections by the server; and transmitting the stored satellite position error correction to the user by the server via the network.

6. The method of claim 1, wherein the using of the retrieved satellite position error corrections includes using the retrieved satellite position error corrections in a real-time or non-real-time manner.

7. A Global Positioning System (GPS) system comprising:

a receiver to collect satellite measurement data and to compute satellite position error corrections using the collected satellite measurement data; and a server coupled to the receiver via a network, the server to store the computed satellite position error corrections and to retrieve the stored satellite position error corrections.

8. The GPS system of claim 7, further comprising:

a user to use the retrieved satellite position error corrections.

9. The GPS system of claim 8, wherein the user is to provide a request to the server for the server to compute pseudo range corrections for a given location using the stored satellite position error corrections and to receive the computed pseudo range corrections from the server via the network.

10. The GPS system of claim 8, wherein the user is to provide a request to the server for the server to retrieve the stored satellite position error corrections and to receive the retrieved satellite position error corrections from the server via the network.

11. The GPS system of claim 7, wherein the receiver is to transmit the computed satellite position error corrections to the server via the network.

12. The GPS system of claim 11, wherein the network includes an Internet network.

13. The GPS system of claim 11, wherein the server is to provide satellite position error corrections in a real-time or non-real-time manner.

14. A server comprising:

a processor to receive computed satellite position error corrections via an Internet network, to store the received satellite position error corrections in a database, to retrieve the stored satellite position error corrections in the database, and to use the retrieved satellite position error corrections.

15. The server of claim 14, wherein the server is to receive the computed satellite position error corrections by a receiver connected to the Internet network.

16. The server of claim 14, wherein the processor is to process a request from a user connected to the Internet network to compute pseudo range corrections using the stored satellite position error corrections and to transmit the computed pseudo range correction to the user.

17. The server of claim 14, wherein the processor is to process a request from a user connected to the Internet network to transmit stored satellite position error corrections to the user.

18. The server of claim 14, wherein the processor is to use the retrieved satellite position error corrections in a real-time or non-real-time manner.

19. A method, comprising:
   developing pseudorange correction information based on a stated reference position for a virtual reference station and a first set of satellite measurement information received at the virtual reference station; and
   broadcasting the pseudorange correction information from the virtual reference station.

20. The method of claim 19 wherein the first set of satellite measurement information is transmitted from a central computer system.

21. The method of claim 20 wherein the first set of satellite measurement information stored in the central computer system is based on a second set of satellite measurement information received from a plurality of fixed reference stations.

* * * * *